United States Patent [19]

Brown, Jr. et al.

[11] 4,212,896

[45] * Jul. 15, 1980

[54] MOLASSES-CONTAINING ANIMAL FEED HAVING RESILIENT STRUCTURE

[75] Inventors: Arthur V. Brown, Jr., Bessemer; Richard J. Karrasch, Sterrett, both of Ala.

[73] Assignee: The Jim Dandy Company, Birmingham, Ala.

[*] Notice: The portion of the term of this patent subsequent to Jul. 24, 1996, has been disclaimed.

[21] Appl. No.: 904,386

[22] Filed: May 10, 1978

Related U.S. Application Data

[63] Continuation-in-part of Ser. No. 853,540, Nov. 21, 1977, Pat. No. 4,162,336.

[51] Int. Cl.$^2$ .............................................. A23K 1/02
[52] U.S. Cl. .................................... 426/623; 426/449; 426/630; 426/635; 426/656; 426/658; 426/805; 426/807
[58] Field of Search ............... 426/623, 658, 635, 805, 426/807, 449, 630, 656; 127/41

[56] References Cited

U.S. PATENT DOCUMENTS

| 3,959,511 | 5/1976 | Balaz et al. | 426/549 |
| 4,018,909 | 4/1977 | Foulkes | 426/658 |
| 4,039,689 | 8/1971 | Bone | 426/623 |

OTHER PUBLICATIONS

Spencer et al. "Cane Sugar Handbook", 8th Edition, John Wiley & Sons, Publishers, New York, 1945, pp. 263-264.

Primary Examiner—R. B. Penland

[57] ABSTRACT

Inclusion of 7½% to 20% of substantially fully-inverted molasses provides a low-cost animal feed which is highly palatable and assimilable to domestic pets and livestock. Prepared by hot extrusion and comprising at least 50% by weight cereal meal and 15% to 35% by weight protein, this product has a partially elastic, partially deformable, chewy, non-crumbly structure. It has unexpected nutritive and physiological advantages especially to the growing animal, as well as cost advantages over the use of sucrose.

Under the process described, the product, when extruded, has a water content of approximately 20% and is dried to about 15% without loss of its unique texture or palatability and with minimal energy cost.

3 Claims, 3 Drawing Figures

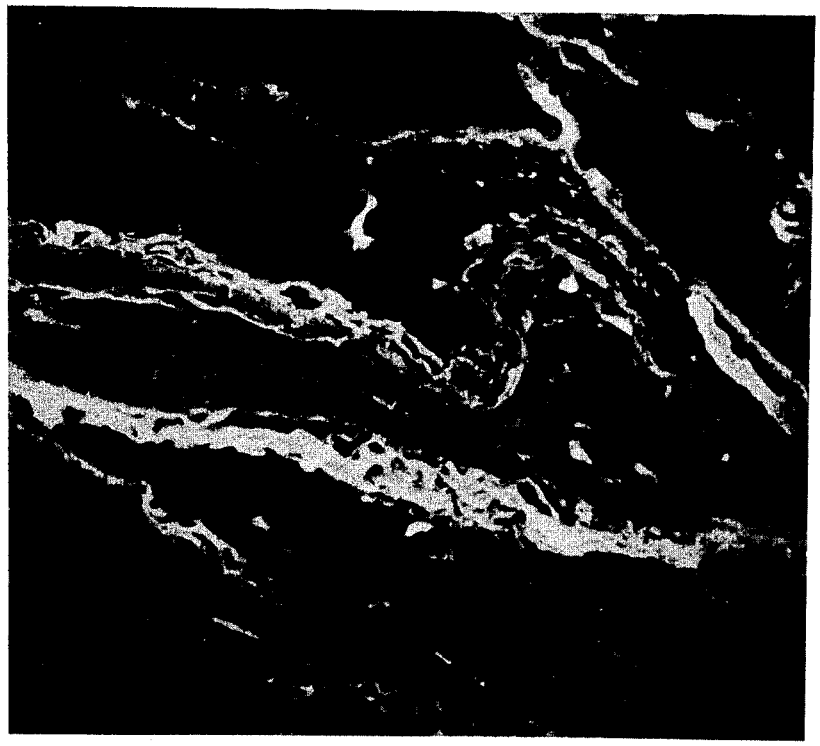
FIG.1 - INVERTED MOLASSES

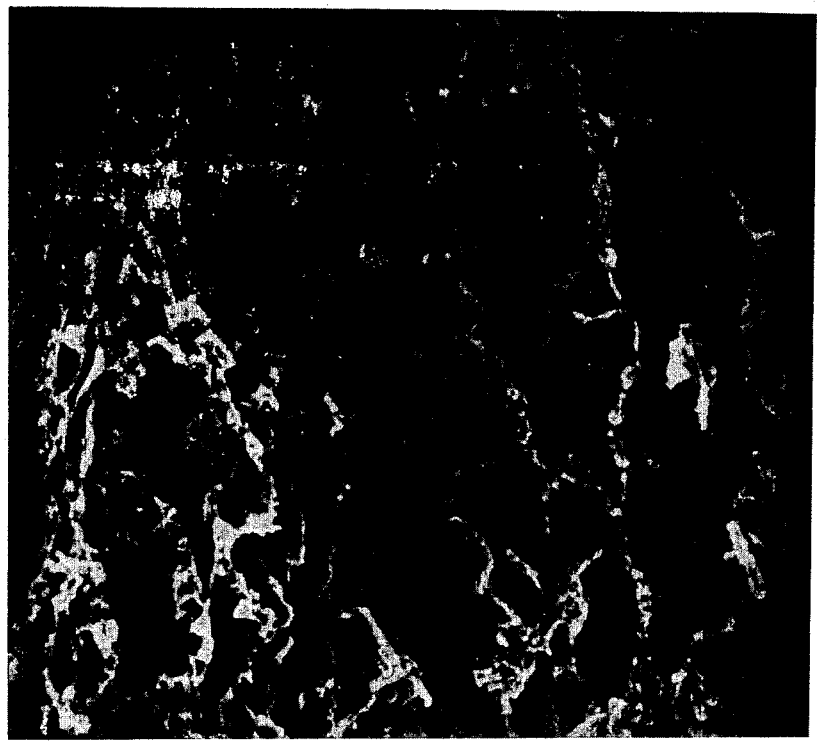
FIG.2 – NON-INVERTED MOLASSES
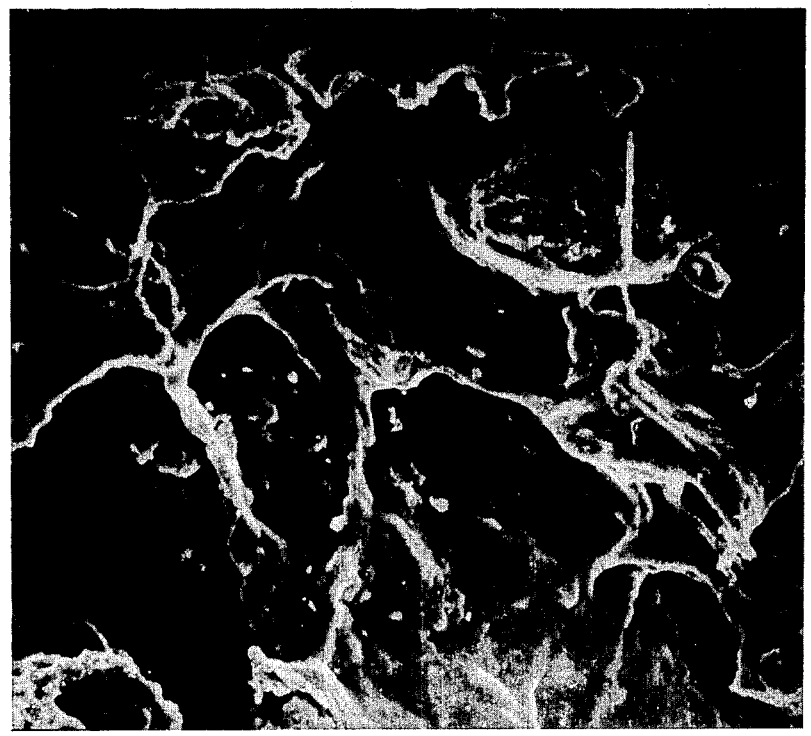
FIG.3 – CORN

MOLASSES-CONTAINING ANIMAL FEED HAVING RESILIENT STRUCTURE

CROSS-REFERENCE TO RELATED APPLICATIONS

This is a continuation-in-part of application Ser. No. 853,540, filed Nov. 21, 1977 now U.S. Pat. No. 4,162,336, entitled MONOSACCHARIDE-CONTAINING DRY PET FOOD HAVING YIELDABLE ELASTIC STRUCTURE.

BACKGROUND OF THE INVENTION

The present invention relates to domestic pet and livestock feedstuffs. Substantially fully-inverted molasses in an extruded cereal meal matrix provides a partially elastic, partially deformable, chewy, non-crumbly structure which increases palatability and relieves dietary stress in young animals.

Dry animal feedstuff incorporating grain meals, animal byproducts, and sugars are widely available. Such conventional sugar-containing feeds are pelletized rather than extruded and are characteristically hard and brittle in texture. Some increased palatability of sugar-containing livestock feeds was noted as early as 1953 and many such feeds now on the market contain some sugar. Several problems, however, were immediately presented in the use of large quantities of sugar in livestock feeds. Sugar, including sucrose, molasses, or simple sugars such as glucose tends to cause an accumulation of water in the bowel leading to severe diarrhea especially in young animals such as piglets. This condition can be partially controlled by the addition of substantial amounts of inert fibers such as begasse pith to the feed (see Brooks & Iwanaga, *J. Anim. Sci.*, 26:741 (1967)). However, addition of sugars to the young swine diet may have a profound effect on the digestibility of protein and fiber (Skipitaris, et al., *J. Amin. Sci.*, 16:55 (1959)). Use of increased fiber to control diarrhea caused by sugar thus reduces the overall assimilation and nutritive value of the feed. Feed conversion studies in pigs demonstrates that utilization of the sugar is enhanced in feeds also containing whey of low lactose content. On the whole, the use of molasses and other sugar compounds in feedstuffs for young weanlings and older growing livestock has been disappointing. These animals (in addition to developing acute diarrhea) show regression in weight gain, intestinal irritations, and other evidence of difficulty in adjusting to the complete conversion from a sow's milk-based diet to commercial feed. Such dietary stress has not been overcome by the addition of sugars, despite the consequent increase in palatability.

In pet foods, sucrose or other sugars which reduce water activity have been incorporated conventionally into extruded products of 15% to 35% moisture, to effect bacteriostasis. In semi-soft or soft-dry (10% to 15% moisture) pet foods, a soft, palatable texture is achieved by use of glycerol, propylene glycol, and higher polyhydrins. Alternatively, substantial amounts of protein adhesives have been used to impart a stringy, fibrous, somewhat soft texture to dry foods, as disclosed in U.S. Pat. No. 3,959,511.

SUMMARY OF THE INVENTION

Incorporation of fully inverted molasses as a source of monosaccharides into animal foods of the dry category (moisture content less than 15%) results in a product having a unique, soft, yieldingly elastic structure, when made by the process as hereafter more fully described. The product of the invention includes at least 50% by weight of cereal meal, between 15% and 35% by weight of total protein, and between 7½% and 20% by weight of fully inverted molasses. The food product so constituted, despite its dryness, is not brittle or crumbly, but is characterized by a yielding, compressive elasticity which continues despite plastic deformation.

To provide a palatable non-crumbling feed for young livestock and domestic pets at commercially feasible costs, the present animal feed utilizes a low cost, substantially fully-inverted molasses as a sugar source in combination with grain meals and animal protein. As prepared by the process of the present invention, it has excellent palatability and appears to substantially relieve the dietary stress experienced by weanling animals such as piglets upon complete conversion to a commercial feed diet.

In the process of the present invention, which is a hot extrusion process, the ingredients, including fully-inverted molasses, are mixed with water at a temperature below the boiling point and introduced into the barrel of an extruder. Enough pressure is applied in the extruder barrel, without any added steam, to cause the molasses solution to permeate and cook the ingredients and bring them to a temperature above the boiling point. On extrusion, a portion of the moisture is flashed off, and the remaining ingredients are puffed, to leave a hot product of substantially 20% moisture content. Drying to a moisture content preferably substantially 15% by weight is carried out during progressive cooling without reheating the product.

BRIEF DESCRIPTION OF THE DRAWINGS

FIG. 1 is a photograph, enlarged 1.5 times, of the resolution of a surface of the present product, made with substantially fully inverted molasses, provided by a scanning electronmicrograph at 200 magnifications.

FIG. 2 is a similarly enlarged photograph made from a scanning electronmicrograph, at similar resolution, of a control specimen similarly made except for the substitution of non-inverted molasses for the inverted molasses.

FIG. 3 is a similarly enlarged photograph made from a scanning electronmicrograph, at similar resolution, of a control specimen similarly made except for the substitution of corn meal for the inverted molasses.

DESCRIPTION OF THE PREFERRED EMBODIMENT

Basic Formula

The animal food of the present invention utilizes a basic dry food formula of moisture content in the general range of 15% by weight. The formula generally comprises a mixture of various cereal meals, a lesser portion of meat and bone meal or fresh meat byproducts, an enriched vitamin source, minerals, vital supplements such as lysine, methionine, and animal fat. In our co-pending application entitled MONOSACCHARIDE-CONTAINING DRY PET FOOD HAVING YIELDABLE ELASTIC STRUCTURE, Ser. No. 853,540, we disclosed a cereal-based formula providing excellent nutrition for dogs. We have further discovered that by using fully inverted molasses as the source of monosaccharides in this basic formula a highly nutritive feedstuff is provided at reasonable cost for both dogs and young growing domestic animals, such as young lambs and cattle, and non-ruminants such as horses and pigs.

The other ingredients of the animal food of the present invention are typical of dry food formulations, containing greater than 50% of vegetable meal comprising ground wheat, yellow corn, and soybean meal. Ground cereal grains derived from corn, oats, wheat, milo, barley, grain byproducts and mixtures thereof are similarly suitable for use in the present product provided that the total of such ingredients is about 45% to 60% by weight. The relatively high carbohydrate content of such vegetable meals is balanced preferably by the addition of between 10% and 25% by weight of meat and bone meal or meat byproducts or fish meal in addition to a small amount (about 50%–10% by weight) of soybean meal and a 60% gluten meal (0%–15% by weight) produced by acid coagulation. Fish meal, dried blood, and the fleshy byproducts of a variety of domestic animals may also be suitable.

In our co-pending application Ser. No. 853,540, we disclosed an animal food of yieldable elastic texture comprised principally of cereal grain meals which contained none of the conventional pet food softening agents such as propylene glycol, glycerol, or higher polyhydric compounds. In the case of swine prestarter or starter feeds, inclusion of such agents would make overall costs prohibitive; yet palatability and texture are important in effecting transition from sow's milk to commercial feed.

It will be recognized that the feed formulation may be varied for specific conditions, thus a piglet feedstuff may include special additives such as lysine, methionine, and trace elements for optimal performance. Since piglet performance on a diet containing sugar may be enhanced by addition of whey, (Aldinger, et al., *J. Anim. Sci.*, 20:249 (1961)), up to 10% low lactose whey may be included in the preferred formula for pigs. Low lactose whey is generally preferred in the present formulation because of an increasing intolerance to lactose with the age of the pig. However, in very young piglets (five days to fourteen days old) the present feedstuff supplements the diet and aids transition from the mother's milk. Accordingly, higher lactose content may be tolerated and even beneficial.

In dog food, the basic cereal composition of the present product is highly nutritive without addition of greater than 25% by weight of meat and bone meal or meat byproducts. Whey may be added but is not necessary for weight gain in puppies and maintenance in the adult dog. Less oats are conventionally used in dog foods than in pig feeds and a special canine vitamin mix is substituted for the swine vitamin mix, reflecting the variation in essential vitamin and mineral requirements of the respective animals. Such variations in essential metabolites and vitamins in various animal species will be apparent to those skilled in the art.

In the present product, it is significant that the so-called plasticizers comprising propylene glycol, glycerol, or other higher polyhydric alcohols are not required for either bacteriostasis or texturizing. Furthermore, the use of large amounts of protein binders or adhesives, heretofore taught to impart a stringy, fibrous texture and appearance to dry dog foods (as described in U.S. Pat. No. 3,959,511), is to be strictly avoided, inasmuch as the compressive elasticity of the present product is associated with a substantially nonfibrous matrix, as hereafter described.

The crucial ingredient in the present cereal-based formulation is substantially fully-inverted molasses. Molasses refers to the raw molasses obtained from the first cane refinery, ordinary blackstrap molasses, and those grades of molasses obtained as the sugar- and impurity-containing rinse of sucrose crystals at intermediate crystallization steps in the further purification of sucrose by the refinery process. Molasses typically contains a complex mixture of sucrose (greater portion), monosaccharides of glucose, fructose, other hexoaldoses and hexoketoses, pentoses and amino sugars, together with a variety of dextrins. In addition, variable amounts of ash are present (up to about 15%) depending on the grade of molasses and consisting in part of mineral ions, sometimes thought to be responsible for intestinal dysfunction in animals fed molasses-containing feed.

In the present inverted molasses the monosaccharide content is derived principally by inversion of the sucrose contained therein to fructose and glucose monomers. Preferably molasses is inverted to the point that only 5% or less by weight of total sugars is residual sucrose. The preferred method of inversion utilizes the invertases from S. cerivisiae which have high specificity for the sucrose beta-glycosidic linkage. Alternatively, acid hydrolysis and other conventional methods of inversion may be used. However, acid hydrolysis is not preferred since this method is considered unreliable in obtaining high degrees of inversion, especially with the cruder molasses forms.

While the presence of some disaccharide or higher sugar does not appear to completely destroy the unique, softly elastic texture of the present product, it is highly desirable to have substantially 80% or more of the sugars as monosaccharides. If less than 60% are monosaccharides, this produces a product of hard, brittle texture, unless some polyhydrins are added. The products are generally indistinguishable texturally from the conventional friable, hard product obtained when no sugar is present.

The ability of the monosaccharide-containing substantially fully-inverted molasses to effect the present softly elastic and resilient texture in the absence of sucrose indicates that it serves a different function than sugars or sugar equivalents in the prior art semi-moist products. In these, where a substantial amount of sucrose was used, simple sugars have been added simply to inhibit crystallization of the sucrose to octahedral form. Similarly, and based upon the same principle, a crude molasses is often partially inverted (5% to 50% inversion) to retard crystallization. Commercially available "invert molasses" is typically 50% inverted; further inversion would render the sugar unpalatably sweet for general use.

The molecular basis of the present surprisingly elastic texture is not now understood and Applicants do not wish to be bound to any particular theory. The monosaccharide ingredient, however, does not here function merely as a humectant in retaining intrinsic water content.

The pH of the present composition does not appear to substantially affect the present texture, and so alter the interaction of the monosaccharide with the macromolecular components. The preferred pH range is 4.5 to 5.2. A pH adjustment is obtained by addition of from 0.1 to 1% of an edible acid such as phosphoric acid. The lowered pH, along with the relatively low moisture content, achieves bacteriostasis; even (as indicated by preliminary tests) at water activity values higher than conventional teachings would consider safe (e.g. U.S. Pat. to Palmer No. 3,873,735).

Feed Conversion and Dietary Stress in Piglets

Table I shows preliminary data for pigs fed the present animal feed of EXAMPLE I hereinbelow. The feed was used as a starter in piglets weaned at approximately two to three weeks and weighing approximately 25 pounds. The pigs gained 63 to 64 pounds respectively over a 57-day period of time and consumed 150 pounds of feed to yield a feed-to-gain ratio of approximately 2.4.

Table I

| Inverted Molasses | test | |
| --- | --- | --- |
| Duroc weanlings | #1 (Male) | #2 (Female) |
| Initial weight | 25 | 25 |
| 57-day weight | 88 | 89 |
| Total gain | 63 | 64 |
| Total feed consumed | 150 | 150 |
| Feed/gain | 2.4 | 2.34 |

The feed/gain ratios shown appear to be exceptionally favorble. Direct comparison with published data and with practical experience is difficult, however, partly for the reasons set forth below. Other properties of the present feed were unexpectedly beneficial to the piglet.

One of the most persistent problems in the young pig occurs upon weaning (13 days to 4 weeks). Piglets experience great stress in converting from sow's milk to commercial feed, with a resultant lag in weight gain. In the very young weanling, dietary stress is exacerbated by changes in ambient temperature and environment resulting in a higher rate of mortality than for other kinds of newborn domestic animals. The inclusion of inverted molasses in the present cereal-based product appears to dramatically reduce the dietary stress in the weanling; piglets adapt readily and enthusiastically to this diet without accompanying regression in weight gain or intestinal irritation. Pigs utilize the feed without waste since chewing action does not shatter the resilient chunks into crumbles as with conventional feeds.

It is well known that piglets up to the age of eight weeks have an immature digestive system; several enzymes necessary for carbohydrate utilization are poorly expressed during this time including the brush-layer invertases of the gut which facilitate hydrolysis of sucrose to glucose and fructose. Although the newborn piglet cannot utilize fructose as an energy source, it is believed that the uptake of fructose at an intermediate stage of piglet development is nutritionally more beneficial than an equivalent amount of glucose alone. Fructose, unlike glucose, is converted largely to triglycerides and glycogen in the liver. Administration of fructse does not induce secretion of insulin, and thus does not interfere with normal blood sugar (glucose) levels. Since very young animals are chronically hypoglycemic, we postulate that the high levels of fructose provided by complete inversion of molasses in the present product contribute to blood sugar level stabilization thus allowing glucose to be taken up without causing acute fluctuations in appetite and feeding patterns.

Another surprising property of the present fully-inverted molasses-containing feed is the young piglet resistance to diarrhea upon ingestion. Sugars of all kinds, especially fructose, are known to induce acute diarrhea in domestic animals by causing hypotonic accumulaton of water in the bowel. Ordinarily, sugars may be fed to animals only at levels low enough to be absorbed through the stomach prior to entrance of the partially digested food matter into the gut. In young piglets of 30 to 50 lbs., diarrhea will readily occur when the molasses content is in excess of 10% (Brooks & Iwanaga, J. Anim. Sci., 26:741 (1967)). It is reported therein that this diarrhea effect may be mitigated by addition of substantial amounts of inert fibrous matter such as bagasse pith. In the present invention, we observe that diarrhea does not occur in pigs at concentrations of 20% invert molasses, even in pigs substantially smaller (and thus more prone to diarrhea) than those in the above-cited literature. It appears that the laminar structure provided by the inverted molasses of the present invention, as hereinafter more fully described, may substitute functionally for the inert fiber material heretofore used. Whereas the inert material is substantially indigestible, the present laminar structure is comprised of nutritious ingredients and this is more efficient as a feedstuff. This unique structure may increase retention time of the food in the digestive tract thereby promoting assimilation. This structure may also remain partially intact in the small bowel so as to effect better distribution of water.

Process of Making the Present Feed

The present invention utilizes a hot extrusion process carefully controlled to yield the product of exceptional structure described. In this process, the food ingredients mentioned, the largest of which by weight is cereal meal, are mixed with water at a temperatue below boiling point and with the substantially fully-inverted molasses which enters into the solution. The mixed ingredients are introduced into the barrel of a conventional extruder, adjusted to apply enough pressure in the extruder barrel to cause the solution of the inverted molasses and water to permeate the meal ingredients, and without addition of steam but merely by mechanical work and pressure, to raise the moisture to a temperature above the boiling point. The product is then emitted from the orifice of the extruder, at a temperature over the boiling point, about 240° F., flashing off a portion of the moisture to obtain a puffed product whose moisture content is substantially 20%. On exiting from the extruding orifice, the emitted product is chopped into short segments about one-half inch in length. The hot segments are driven to a dryer and as they progressively cool, they are dried to a moisture content of substantially 15% by weight or less, but not below 10%. It is important that the cooling be progressive. Hence, drying may be by ambient air or with minimal heat to slow their cooling but not raise their temperature, under controlled humidity as is conventional in avoiding "case hardening" of macaroni products.

Batches of feed were compounded in accordance with the formulation of the examples of Tables II, III and IV which follow. Examination of specimens from all three samples by light microscopy after carbohydrate- and protein-specific staining demonstrated that in all samples there was a uniform distribution of the carbohydrate and protein ingredients. This examination requires the conclusions that the mechanical working in the extruder barrel brought about uniform distribution and intimate association of the ingredients. Hence, the unique structure which attends the use of the fully invert sugars was necessarily due to chemical interaction.

This process has the following advantages: by introducing water below the boiling point, instead of steam, in the heavy bulk mixture, much energy is saved; and there is another large energy-saving in drying to 20% moisture content merely by expansion at the orifice, and thereafter in drying to 15% moisture by merely delivering ambient air to the product instead of heated air. Such low-temperature drying is here found to be absolutely necessary to preserve the softly elastic texture of the product.

EXAMPLE I

Table II lists the components of a typical formulation of the present invention. Cereal components comprise approximately 53% of the mixture excluding the corn gluten meal. Protein content is approximately 21%–23%. The vitamin and mineral component provides conventional vitamin requirements in which the brewer's yeast is a convenient source of vitamins of the B series. Sorbic acid is added as a suitable mold inhibitor. In the liquid mix, the 15% substantially fully-inverted molasses represents 15% by weight of molasses containing 80% water, so that the final proportion of invert molasses is about 12%.

Table II

| Dry Ingredient Mix | % by weight |
| --- | --- |
| Ground wheat | 33.40 |
| Ground yellow corn | 14.95 |
| 48% meat scraps | 11.15 |
| 44% soybean meal | 5.60 |
| 60% corn gluten meal (acid coagulated) | 17.55 |
| Vitamin & Mineral Mix | |
| Brewer's yeast | .54 |
| Dog mineral mix | .29 |
| Dog vitamin mix | .11 |
| Sorbic acid | .16 |
| Potassium sorbate | .11 |
| Whey type-K | .54 |
| Liquid Mix | |
| Phosphoric acid | 0.60 |
| Fat-animal | 1.00 |
| 100% inverted molasses | 15.00 |

The dry mix was weighed out and put into a mixer. The vitamin and mineral mix was then added and allowed to mix for several minutes before the syrup containing the fully-inverted molasses, phosphoric acid, and fat were added. Overall moisture was adjusted to provide about 20% by weight of the final formulation.

Extrusion was carried out on a Wenger X-20 extruder, at a feeder screw rate of 17 rpm. The temperature maintained in the heads along the extruder barrel were 98° F., 140° F., 160° F., 95° F., 95° F. and 90° F. respectively to provide temperature control and prevent overcooking. The density of the product was approximately 22 lbs./cu. ft.

EXAMPLE II

EXAMPLE II is a control formulation substituting 15% of ordinary molasses (not specially inverted) containing 20% water for the invert molasses of EXAMPLE I. Table III indicates that the other components were identical to the formula of EXAMPLE I. Extrusion was carried out on the Wenger X-20 extruder under identical conditions to EXAMPLE I.

Table III

| | % by weight |
| --- | --- |
| Dry Mix Ingredients | |
| Ground wheat | 33.40 |
| Ground yellow corn | 14.95 |
| 48% meat scraps | 11.15 |
| 44% soybean meal | 5.60 |
| 60% gluten meal | 12.55 |
| Vitamin & Mineral Mix | |
| Brewer's yeast | 0.54 |
| Dog mineral mix | .29 |
| Dog vitamin mix | .11 |
| Sorbic acid | .16 |
| Potassium sorbate | .11 |
| Whey type-K | .54 |
| Liquid Mix | |
| Phosphoric acid | 0.60 |
| Animal fat | 1.00 |
| Uninverted molasses syrup | 15.00 |

EXAMPLE III

In this example, 15% by weight of a solution containing suspended corn meal was added instead of either invert molasses or uninverted molasses. This example thereby provides a control product of a formulation identical to EXAMPLES I and II containing no sugars whatever. Again, the extrusion was carried out on the Wenger X-20 extruder under identical conditions to EXAMPLES I and II.

Table IV

| | % by weight |
| --- | --- |
| Dry Mix Ingredients | |
| Ground wheat | 33.40 |
| Ground yellow corn | 14.95 |
| 48% meat scraps | 11.15 |
| 44% soybean meal | 5.60 |
| 60% corn gluten meal (acid coagulated) | 12.55 |
| Vitamin & Mineral Mix | |
| Brewer's yeast | 0.54 |
| Dog mineral mix | 0.29 |
| Dog vitamin mix | 0.11 |
| Sorbic acid | 0.16 |
| Potassium sorbate | 0.11 |
| Whey type-K | 0.54 |
| Liquid Mix | |
| Phosphoric acid | .60 |
| Animal fat | 1.00 |
| Ground yellow corn | 15.00 |

Studies on Microstructure of the Present Feed

To better understand the unique texture of the present invention, a statistically significant number of representative samples were examined by scanning electron-microscopy, which provides high resolution visualization for examining the three-dimensional surface laid open. The samples were prepared by the critical point drying method described by Narconis, Proc. of the 8th Annual Scanning Electron Microscope Symposium, April, 1975. The procedure is generally as follows: samples were fixed in 4% glutaraldehyde in 1 M phosphate buffer, followed by rinsing in buffer and progressive dehydration in a series of acetone solutions of increasing acetone proportion, ending with 100% acetone. In the critical point drying step, the acetone is replaced with low temperature carbon dioxide; at 1600 psi the gas/liquid interface disappears and the sample is allowed to dry. The dried samples are then mounted on metal stubs with silver glue and coated with a 100 angstrom thick coating of gold/platinum under vacuum. The critical point drying procedure minimizes ultrastructural distortion and microscopic artifacts typically seen with conventional air-drying. The samples thus prepared were scanned and photographed in the JEOL 35 Scanning Electron Microscope at magnifications of 10 to 2,000 diameters.

FIG. 1 shows an electronmicrograph of a cross-section of the product of the present invention as prepared in EXAMPLE 1. The sample was cut and treated according to the critical point drying method described hereinabove. At a magnification of 200×, the product is typically characterized in being made up, in its greater part, of convoluted layers; and in its lesser part by inclusions in fissure-like spaces of elongated chamber-like cells whose width in cross-section is about 20 to 200 microns. In FIG. 1, the convoluted, layered portions appear as relatively electron-dense bodies containing the 5 to 15 micron thick lamina. At the edges of thee bodies, the lamina have been pulled apart somewhat by the cutting procedure, indicating their laminar organization. THe fissure-like spaces and their inclusions appear to provide natural fracture lines for the product and breakage under compression appears to occur along these lines. Direct examination of the fissure surfaces by electronmicoscopy (not shown) reveals a spongy, porous structure of discrete chamber-like cells.

A comparative electromicrograph of a similary constituted specimen, dried by reheating, showed coalescence of the laminae and some constriction of the convoluted layers. This specimen was hard and unyielding, demonstrating the importance of drying without reheating.

FIG. 2 shows an electronmicrograph at 220× of the control product of EXAMPLE II, otherwise identical to the formula of EXAMPLE I, except for using ordinary molasses, i.e., not specially inverted. THe structure of this product appears as webs of chamber-like cells, most of which are about 40 to 200 microns in diameter and having somewhat fibrous walls. This structure occurs substantially uniformly throughout the product regardless of whether it is examined at a line of cross-section or at a crumbled surface.

In the product shown in FIG. 3, no sugar of any kind is present; in this control corn is substituted therefor as in the formula of EXAMPLE III. At a magnification of 200×, the product appears to be comprised of chamber-like cells morphologically identical to but slightly larger than those of EXAMPLE II (uninverted molasses). Similarly, this structure is substantially uniform throughout the product.

We hypothesize, without limitation, that this chamber-like cell structure, seen in both the noninverted molasses-containing and corn-containing controls, confers rigidity to the product at low moisture content, thereby yielding the hard, friable texture noted in the micrometer compressibility test. In contrast, the relatively dense, convoluted, layered structure of the present product, interspersed with the fissures containing chamber-like cells, is associated with the springy, compressible texture of the present product.

The structure of the present product was further studied by high magnification transmission electronmicroscopy and compared with the non-inverted molasses-control of EXAMPLE II. The procedure for preparing samples is as follows: samples were fixed in 4% glutaraldehyde-phosphate buffer, further fixed in 2% osmium tetroxide, and dehydrated progressively in a series of ethanol solutions of increasing ethanol proportion ending with 95% ethanol. This solution was changed to 100% propylene oxide and finally placed in a one-to-one mixture of propylene and epoxy resin. Following evaporation of the propylene, the sample thus treated was embedded in pure epoxy resin and polymerized overnight at 60° C. The samples were then sectioned to a thickness of approximately 0.1 microns on an LKB-Huxley ultra-microtome. The sections were stained in lead citrate/uranyl acetate and examined in a Phillips 300 Transmission Electron Microscope. At 25,000× both the invert molasses product of EXAMPLE I and the noninverted molasses-containing product of EXAMPLE II appeared to be predominantly vacuolar in structue with electron-dense matter interconnecting these vacuoles and forming the surface of the walls thereof.

However, at 75,000×, the limit of visual resolution, marked differences in structure were made evident. The intervacuolar matter of the present monosaccharide-containing product, EXAMPLE I, shows no organized structure, suggesting that the layer-like convolutions observed by scanning electronmicroscopy are comprised of large regions of random coiled molecules. In contrast, the noninverted molasses-containing of EXAMPLE II appears, at 75,000×, as a great multiplicity of fine hair-like filaments, suggesting that the fibrous wall structure observed under scanning electronmicroscopy is itself composed of smaller fiber-like bundles of molecules in microfilaments. Applicants, however, are not presently able to interpret this difference in terms of the elastic texture of the present product.

These studies suggest that the monosaccharide of invert molasses may interact molecularly with the starch and/or protein components of the present composition. We theorize, but without limitation, the following: (a) that the monosaccharide so interacts with the partially charged moieties of the present composition that substantial secondary bonding and electrostatic interaction between carbohydrates and/or protein molecules is altered or prevented; and (b) syneresis, arising from such secondary interactions between starch molecules and known to confer a rigidity to starch-based matrices, is thereby prevented or substantially lessened.

Mechanical Tests of Elasticity

Two types of mechanical tests were made, comparing the properties exhibited by the present product with the sucrose and corn controls.

I. Repetitive partly relieved compressive deflections:

No conventional mechanical test demonstrates desirable chewiness. This characteristic may be approximated however by demonstrating that a product deflects and deforms under each repeated compressive force, but demonstrates a partial elastic recovery between them.

To test the present product against controls, the following procedure was used: pellets in the general range of one-half inch in thickness were placed between the anvil and spindle of the micrometer caliper. The caliper was brought snug to hold the pellet firmly. Thereafter, cycles of deflection were applied and relieved as follows: on application, 0.010" followed by a partial reversal of 0.005". On such repeated deflections, the micrometer caliper effectively chewed its way through the pellets. A pellet was to be adjudged relatively chewy by the number of cycles of repeated force applications and relief up to the oint if fell from the caliper, either (a) by crumbling under deflection, or (b) by failure to restore elastically sufficiently to remain in the caliper when the deflection was so partially relieved.

Specimens 4 (EXAMPLE I) comprised a basic cereal-based pet food as here disclosed which contains approximately 12% by weight fully-inverted molasses. Specimens 2 (EXAMPLE II) utilized the same formula, except uninverted molasses 12% by weight is substituted for the invert molasses. Specimens 1 (EXAMPLE III) contained the same proportions of ingredients but ground corn meal was substituted for the sugars.

Table V

| CODE | | % H$_2$O | Original Thickness (inches) | Cycles to Fall Out | Deflection Sustained (inches) |
|---|---|---|---|---|---|
| 4B | (Invert | 10.8 | 0.475" | 80 | 0.400 |
| 4B | Molasses) | | 0.475 | 44 | 0.220 |
| 4B | | | 0.490 | 38 | 0.190 |
| 4B | | | 0.517 | 88 | 0.440 |
| 4B | | | 0.477 | 40 | 0.200 |
| 4B | | | 0.504 | 56 | 0.280 |
| 2B | (Non- | 10.6 | 0.446" | 11 | 0.055 |
| 2B | inverted | | 0.480 | 14 | 0.070 |
| 2B | Molasses) | | 0.583 | 13 | 0.065 |
| 2B | | | 0.523 | 13 | 0.065 |
| 2B | | | 0.575 | 15 | 0.075 |
| 1B | (Corn) | 10.6 | 0.460" | 10 | 0.056 |
| 1B | | | 0.432 | 6 | 0.030 |
| 1B | | | 0.445 | 9 | 0.045 |
| 1B | | | 0.443 | 11 | 0.065 |
| 4A | (Invert | 15.4 | 0.510" | 90* | 0.450 |
| 4A | Molasses) | | 0.500 | 90* | 0.450 |
| 4A | | | 0.500 | 90* | 0.450 |
| 2A | (Non- | 15.0 | 0.450" | 79 | 0.395 |
| 2A | inverted | | 0.455 | 56 | 0.280 |
| 2A | Molasses) | | 0.475 | 83 | 0.415 |
| 1A | (Corn) | 15.6 | 0.425" | 79 | 0.395 |
| 1A | | | 0.463 | 70 | 0.350 |
| 1A | | | 0.480 | 79 | 0.395 |

*Discontinued without falling out

The controls could withstand a substantial number of cycles of deflections and partial relief only at the higher moisture content level. At 10.6% moisture they crumbled after only a few cycles; and the maximum accumulated deflections they could withstand ranged from about 10% of their original thickness for the corn specimens to 15% of original thickness for noninverted molasses specimens. While at the higher moisture content they deformed more readily and crumbled less, they demonstrated little elastic resiliency and ultimately fell from the caliper when its deflection was partly relieved.

The present product specimens 4B, at 10.8% moisture, were both yielding and elastically resilient despite their dryness. Despite focal fractures they typically withstood, with residual elastic resiliency, the cycles of deflection and partial relief to a total compressive deflection of usually at least 40% of their original thickness; and it appers that substantially all specimens will withstand compressive deflection of more than 30% of their thickness without crumbling. At 15.4% moisture content, the elastic resiliency of the present product specimens 4A was such that they would not fall from the caliper, even after the cycles of compression had reduced them by 9/10ths of their original thickness.

II. Shear resistance and travel to fracture

Conventional dry foods fracture and crumble when incised. An Instrom universal tester #1122 was employed to measure the shear travel before fracturing of the present product and controls. The resistance in kilograms built up during such travel as the blades pressed through the specimens was measured by a Kramer shear cell and recorded on a moving chart. Table VI shows the results of these tests, all specimens being at approximately 10% moisture content. The succesive columns correspond to the shear travel to fracture, measured in millimeters. The figures in each row indicate the kilograms of resistance at successive 1 mm intervals as the blades passed through each sample. The figures in each row terminate when increased shear travel was attended by a drop in resistance, indicating that fracture had occurred.

Table VI

| Specimens | | Shear travel to fracture (millimeters) | | | | | | | |
|---|---|---|---|---|---|---|---|---|---|
| | | 1 | 2 | 3 | 4 | 5 | 6 | 7 | 8 |
| | | Measured resistance (kilograms) | | | | | | | |
| Invert | #1 | 14 | 36 | 60 | 72 | 110 | | | |
| Molasses | #2 | 10 | 15 | 20 | 30 | 44 | 76 | 88 | |
| | #3 | 10 | 14 | 24 | 33 | | | | |
| | #4 | 3 | 12 | 22 | 28 | | | | |
| Noninverted | #5 | 30 | | | | | | | |
| Molasses | #6 | 29 | 52 | | | | | | |
| (control) | #7 | 36 | | | | | | | |
| | #8 | 8 | 21 | | | | | | |
| Corn | #9 | 5 | 21 | | | | | | |
| (control) | #10 | 6 | | | | | | | |
| | #11 | 30 | 42 | | | | | | |
| | #12 | 10 | 15 | 21 | | | | | |
| | #13 | 6 | 20 | 28 | | | | | |

At 10% moisture content, the samples of the product formulated with fully invert molasses withstood shear travel measured at several times as great as the controls. The measured resistance increased almost linearly with the amount of shear travel, indicating that the texture was substantially elastic prior to fracture.

Attempted similar comparative tests with the described equipment and with samples and controls at 15% moisture content were inconclusive. At such higher moisture content it appeared that the shear could slice through samples, regardless of formulation, without that sudden drop in shear resistance taken, in the 10% moisture tests as indicative of fracture.

The chewy, non-friable texture which the present product affords appears to bring about significantly greater preference, in dog feeding tests, over dry foods having a conventional hardness and crumbliness. In swine feeding tests with post-weanling pigs, this texture imparts desirable chewiness and physical properties aiding digestion, which assist the animals in making the complete transition to commerical feeds.

Throughout the specification the invention has been described as applied to pet and livestock foods. In compounding such foods, it is necessary to provide balanced nutrition, for which purpose the present invention is especially well suited. Nevertheless, it applies also to foods for human consumption, for example, cereal breakfast foods, in which refined molasses would be used; and the repeated references to animal feedstuffs and pet foods herein are not to be taken as excluding from the scope of the invention foods for human beings.

In the claims, the references to percentages of protein include the protein present in the cereal meal.

We claim:

1. a molasses-containing extruded food consisting essentially of

50% to 60% by weight of ground cereal grains,

15% to 35% by weight of a non-adhesive protein inclusive of the protein in said cereal grains, 7½% to 20% by weight of inverted molasses, and 10% to 15% by weight of water, said food having a microstructure, as seen by scanning electronmicroscopy at 200×, comprised in its greater part by convoluted layers and in its lesser part by inclusions in fissure-like spaces of elongated chamber-like cells, and being compressively deformable by more than 20% of its thickness without disintegration by crumbling and without loss of substantial elastic resiliency.

2. An extruded molasses-containing food consisting essentially of

50% to 60% by weight of ground cereal grains,

15% to 35% by weight of non-adhesive protein inclusive of the protein in said cereal grains, 7½% to 20% by weight of inverted molasses, and 10% to 15% by weight of water, said food having a microstructure, as seen by scanning electronmicroscopy at 200×, comprised in its greater part by convoluted layers and in its lesser part by inclusions in fissure-like spaces of elongated chamber-like cells.

3. An extruded molasses-containing food consisting essentially of

50% to 60% by weight of ground cereal grains,

15% to 35% by weight of non-adhesive protein inclusive of the protein in said cereal grains, 7½% to 20% by weight of inverted molasses, and 10% to 15% by weight of water, said food being compressively deformable by more than 20% of its thickness without disintegration by crumbling and without loss of substantial elastic resiliency.

* * * * *

UNITED STATES PATENT AND TRADEMARK OFFICE
CERTIFICATE OF CORRECTION

PATENT NO. : 4,212,896
DATED : July 15, 1980
INVENTOR(S) : Arthur V. Brown, Jr., et al.

It is certified that error appears in the above-identified patent and that said Letters Patent are hereby corrected as shown below:

In column 3, line 16, delete "50%" and insert in its place ---5%---.

In column 5, line 10, delete "to" and insert in its place ---and---.

In column 5, line 55, delete "fructse" and insert in its place ---fructose---.

In column 9, line 19, delete "thee" and insert in its place ---these---.

In column 9, line 22, delete "THe" and insert in its place ---The---.

In column 9, line 34, delete "220X" and insert in its place ---200X---.

In column 9, line 37, delete "THe" and insert in its place ---The---.

In column 10, line 15, delete "structue" and insert in its place ---structure---.

In column 10, line 25, after the words "molasses-containing" insert the word ---product---.

UNITED STATES PATENT AND TRADEMARK OFFICE
CERTIFICATE OF CORRECTION

PATENT NO. : 4,212,896
DATED : July 15, 1980
INVENTOR(S) : Arthur V. Brown, Jr., et al.

It is certified that error appears in the above—identified patent and that said Letters Patent is hereby corrected as shown below:

In column 11, line 2, delete "oint" and insert in its place -- point --.

Signed and Sealed this

Eleventh Day of November 1980

[SEAL]

Attest:

SIDNEY A. DIAMOND

Attesting Officer

Commissioner of Patents and Trademark